(12) United States Patent
Deaguero et al.

(10) Patent No.: US 7,814,412 B2
(45) Date of Patent: Oct. 12, 2010

(54) INCREMENTALLY UPDATING AND FORMATTING HD-DVD MARKUP

(75) Inventors: Joel Deaguero, Redmond, WA (US); Jeffrey Davis, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 11/694,777

(22) Filed: Mar. 30, 2007

(65) Prior Publication Data

US 2008/0168344 A1  Jul. 10, 2008

Related U.S. Application Data

(60) Provisional application No. 60/883,763, filed on Jan. 5, 2007.

(51) Int. Cl.
*G06F 17/22* (2006.01)
(52) U.S. Cl. .................................................... 715/236
(58) Field of Classification Search .......... 715/234–242
See application file for complete search history.

(56) References Cited

U.S. PATENT DOCUMENTS

| | | | |
|---|---|---|---|
| 6,442,755 B1 * | 8/2002 | Lemmons et al. ............. | 725/47 |
| 6,473,379 B1 | 10/2002 | Kim et al. | |
| 6,556,248 B1 * | 4/2003 | Kim ........................... | 348/478 |
| 6,865,747 B1 | 3/2005 | Mercier | |
| 6,934,740 B1 * | 8/2005 | Lawande et al. ............ | 709/213 |
| 7,028,040 B1 * | 4/2006 | Butler et al. ...................... | 1/1 |
| 7,058,290 B1 | 6/2006 | Kim et al. | |
| 7,110,605 B2 | 9/2006 | Marcellin et al. | |
| 2002/0006273 A1 | 1/2002 | Seo et al. | |
| 2002/0078144 A1 * | 6/2002 | Lamkin et al. .............. | 709/203 |
| 2002/0112247 A1 * | 8/2002 | Horner et al. ............... | 725/112 |
| 2003/0182627 A1 * | 9/2003 | Chung et al. ................ | 715/513 |
| 2004/0073871 A1 * | 4/2004 | Giannetti .................... | 715/513 |
| 2004/0139395 A1 * | 7/2004 | Chung et al. ................ | 715/513 |
| 2004/0179822 A1 * | 9/2004 | Tsumagari et al. ............ | 386/96 |
| 2004/0201618 A1 * | 10/2004 | Alderson .................... | 345/744 |
| 2004/0247292 A1 * | 12/2004 | Chung et al. ................. | 386/95 |

(Continued)

FOREIGN PATENT DOCUMENTS

EP  1583099  10/2005

(Continued)

OTHER PUBLICATIONS

Zhou et al., A Structured Document Model for Authoring Video-Based Hypermedia, 2005, IEEE, Proceedings of the 11th Intl. Multimedia Modeling Conf., pp. 1-6.*

(Continued)

*Primary Examiner*—Doug Hutton
*Assistant Examiner*—Frank D Mills
(74) *Attorney, Agent, or Firm*—Lee & Hayes, PLLC

(57) ABSTRACT

Systems, methods, and/or techniques ("tools") for incrementally updating and formatting high-definition digital versatile disk (HD-DVD) markup are described herein. The tools may receive first markup representing a first scene description to be read from a HD-DVD, and may map the first markup into a first area composite for presentation to a user. The tools may then receive second markup representing a second scene description to be read from the HD-DVD. In response to receiving the second markup, the tools may incrementally remap a portion of the first scene description into a second area composite for presentation to the user.

18 Claims, 10 Drawing Sheets

U.S. PATENT DOCUMENTS

| | | | |
|---|---|---|---|
| 2004/0255235 A1* | 12/2004 | Jung et al. | 715/500.1 |
| 2005/0166232 A1* | 7/2005 | Lamkin et al. | 725/43 |
| 2005/0182828 A1* | 8/2005 | Lamkin et al. | 709/219 |
| 2005/0193425 A1* | 9/2005 | Sull et al. | 725/135 |
| 2005/0213942 A1* | 9/2005 | Seo et al. | 386/95 |
| 2005/0244148 A1* | 11/2005 | Tsumagari et al. | 386/125 |
| 2005/0259968 A1* | 11/2005 | Tsumagari et al. | 386/95 |
| 2006/0064716 A1 | 3/2006 | Sull et al. | |
| 2006/0098944 A1* | 5/2006 | Kobayashi et al. | 386/95 |
| 2006/0114808 A1 | 6/2006 | Sugaya et al. | |
| 2006/0123450 A1 | 6/2006 | Wei et al. | |
| 2006/0136815 A1* | 6/2006 | Jung et al. | 715/513 |
| 2006/0182418 A1 | 8/2006 | Yamagata et al. | |
| 2006/0188226 A1* | 8/2006 | Park | 386/95 |
| 2006/0210247 A1 | 9/2006 | Lee | |
| 2006/0257104 A1 | 11/2006 | Yamagata et al. | |
| 2006/0291813 A1 | 12/2006 | Ando et al. | |
| 2007/0006061 A1* | 1/2007 | Colle | 715/500.1 |
| 2007/0006062 A1* | 1/2007 | Hayes et al. | 715/500.1 |
| 2007/0006063 A1* | 1/2007 | Jewsbury et al. | 715/500.1 |
| 2007/0006065 A1* | 1/2007 | Jewsbury et al. | 715/500.1 |
| 2007/0006078 A1* | 1/2007 | Jewsbury et al. | 715/716 |
| 2007/0006079 A1* | 1/2007 | Jewsbury et al. | 715/716 |
| 2007/0014544 A1* | 1/2007 | Kim | 386/112 |
| 2007/0047901 A1* | 3/2007 | Ando et al. | 386/45 |
| 2007/0226613 A1* | 9/2007 | Tandriono et al. | 715/530 |
| 2008/0028302 A1* | 1/2008 | Meschkat | 715/255 |

FOREIGN PATENT DOCUMENTS

EP    1693848    8/2006

OTHER PUBLICATIONS

Yuki et al., An Efficent Approach for Providing Update Information Among Networked Appliances, 2005, IEEE, Proceedings of CCNC '06, pp. 998-1002.*

Bouchou et al., Updates and Incremental Validation of XML Documents, 2003, Springer-Verlag, Lecture Notes in Computer Science vol. 2921, pp. 216-232.*

Huang, et al, "New Optical Storage Formats Developed in Taiwan", retrieved at <<http://ieeexplore.ieee.org/iel5/20/30374/01396271.pdf?isnumber=&arnumber=1396271>>, IEEE Transactions on Magnetics, vol. 41, No. 2, Feb. 2005, IEEE, 2005, pp. 962-966.

Imoji, et al., "HD DVD Video Player", retrieved at <<http://ieeexplore.ieee.org/iel5/10651/33618/01598364.pdf?isnumber=&arnumber=1598364>>, IEEE, 2006, pp. 169-170.

Shibatoko, et al., "Optical Head and Optical Disk Technologies for HD DVD", retrieved at <<http://ieeexplore.ieee.org/iel5/9776/30841/01429691.pdf?isnumber=&arnumber=1429691>>, IEEE, 2005, pp. 11-12.

PCT Search Report for Application No. PCT/US2007/088763, mailed May 26, 2008 (10 pages).

* cited by examiner

INCREMENTALLY UPDATING AND FORMATTING HD-DVD MARKUP

CROSS-REFERENCE TO RELATED APPLICATIONS

This application claims the benefit of the filing date of U.S. Provisional Patent Application Ser. No. 60/883,763, filed on 5 Jan. 2007, to the fullest extent permitted by 35 U.S.C. §119. The contents of this provisional application are incorporated by this reference as if set forth verbatim herein.

BACKGROUND

High-definition digital versatile disks (HD-DVD) media and related players are becoming more popular and widely used. As more manufacturers enter this market, competition increases, tending to drive prices downwards. In this pricing environment, software running within the HD-DVD players typically runs on relatively inexpensive consumer hardware.

Transforming HD-DVD content and style markup into tangible form for display is computationally expensive. Typically, a reasonable goal for a rendering rate for HD-DVD markup is approximately 24 frames per second, for an acceptable user experience. Conventional techniques for transforming and rendering the HD-DVD markup may face difficulties when attempting to reach this rendering rate goal due to performing the computationally expensive task of formatting all relevant HD-DVD content and style markup on every clock pulse on low-cost consumer hardware.

SUMMARY

Systems, methods, and/or techniques ("tools") for incrementally updating and formatting high-definition digital versatile disk (HD-DVD) markup are described herein. The tools may receive first markup representing a first scene description to be read from a HD-DVD, and may map the first markup into a first area composite for presentation to a user. The tools may then receive second markup representing a second scene description to be read from the HD-DVD. In response to receiving the second markup, the tools may incrementally remap a portion of the first scene description into a second area composite for presentation to the user.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTIONS OF THE DRAWINGS

Tools related to incrementally updating and formatting HD-DVD markup are described in connection with the following drawing figures. The same numbers are used throughout the disclosure and figures to reference like components and features. The first digit in a reference number indicates the drawing figure in which that reference number is introduced.

DETAILED DESCRIPTION

Overview

The following document describes tools capable of performing and/or supporting many techniques and processes. The following discussion describes exemplary ways in which the tools incrementally update and format high-definition digital versatile disk (HD-DVD) markup. This discussion also describes other techniques and/or processes that the tools may perform.

For the purposes of formatting HD-DVD content and style markup into tangible form as described herein, the term "state" may refer to any of the states and/or styles defined by the HD-DVD spec, and the term "state transition" refers to any change in value for any HD-DVD state or style.

Figure 1:
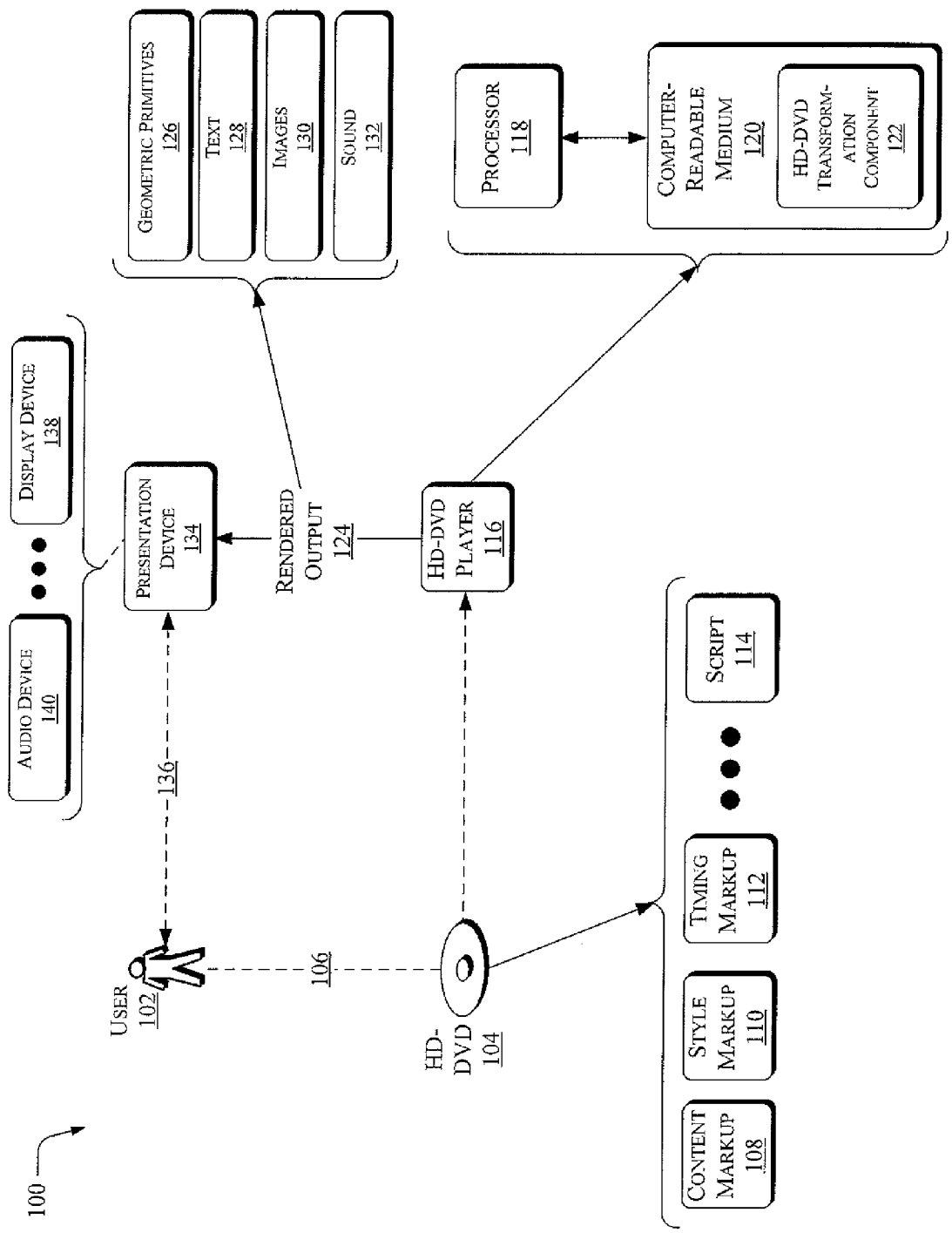
FIG. 1 is a block diagram illustrating operating environments for incrementally updating and formatting HD-DVD markup.

FIG. 1 illustrates operating environments 100 for incrementally updating and formatting HD-DVD markup. The operating environments 100 may enable one or more users 102 to playback one or more HD-DVD disks 104, as represented generally by the dashed line 106.

These HD-DVD disks 104 may include one or more machine-readable components. These components may include, for example, a content mark up portion 108, which may include an XML vocabulary that defines a structured tree of elements. These elements may specify visual or audio content that may be presented to the user when the HD-DVD disks are played back.

The DVD disks 104 may also include a style markup portion 110, which may include an XML vocabulary that describes how the elements that are included in the content mark up portion 108 are to appear when presented to the user. Put differently, the content mark up portion may specify what elements are rendered to the user; the style markup portion may specify how these elements are rendered to the user.

Table 1, presented below, illustrates a tree of HD-DVD content markup elements.

TABLE 1

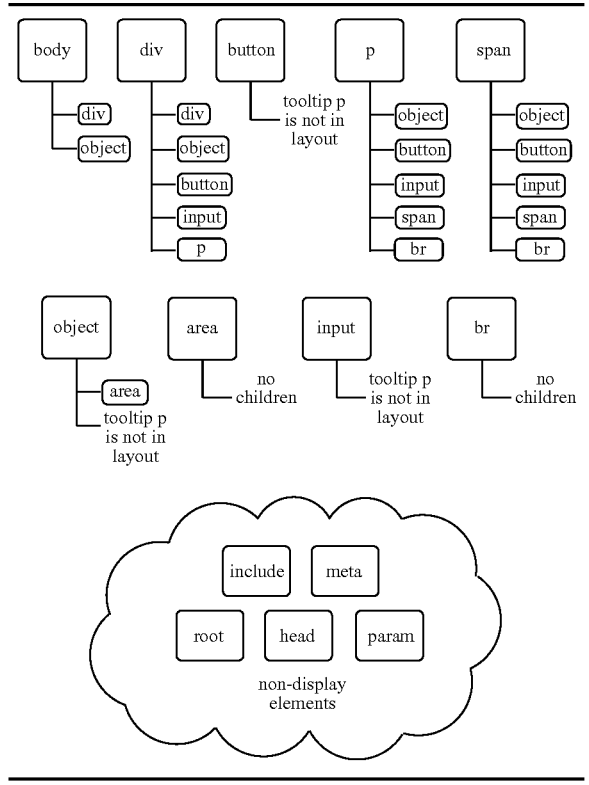

The DVD disks 104 may also include a timing markup portion 112, which may include an XML vocabulary that specifies one or more style markup changes over time.

The content mark up portion, the style markup portion, and the timing markup portion may be implemented in a declarative programming language. However, a script portion 114 may be implemented in an imperative programming vocabulary that causes non-deterministic changes in the style markup over time.

The operative environments 100 may enable the users 102 to insert the HD-DVD disks 104 into an HD-DVD player 116 for playback, as represented by the dashed line connecting the disk 104 and the player 116. The HD-DVD player 116 may be a computer-based system that includes one or more processors, denoted at 118. These processors may also be categorized or characterized as having a given type or architecture, but may or may not have the same type or architecture.

The HD-DVD player may also include one or more instances of machine-readable or computer-readable storage media, denoted generally at 120. The computer-readable media 120 may contain instructions that, when executed by the processor 118, perform any of the tools or related functions that are described herein as being performed by the HD-DVD player. The processor may access and/or execute the instructions embedded or encoded onto the computer-readable media, and/or may access data stored in the computer-readable media.

Turning in more detail to the computer-readable media 120, it may include one or more instances of a HD-DVD transformation component 122. The HD-DVD transformation component 122 may include, for example, one or more software modules, which when loaded into the processor and executed, cause the HD-DVD player to incrementally update and format HD-DVD markup for rendering to the user.

FIG. 1 generally denotes at 124 the output of the markup as rendered to the user. For convenience of description, but not to limit possible implementations, FIG. 1 includes several examples of elements that the rendered markup may include. As noted above, the content markup portion 108 may specify at least some of these elements, which may include one or more geometric primitives 126. Examples of the geometric primitives 126 may include elements used to build menu boxes, graphic elements, or other features of user interfaces.

The rendered output 124 may include one or more textual elements, denoted generally at 128. Examples of these text elements 128 may include labels, descriptions, or other alphanumeric or character-based information presented to the user in the rendered output 124.

The rendered output 124 may include one or more instances of image and/or video elements, denoted generally at 130. These images or video elements may be included as part of user interface devices (e.g., menu boxes, or the like), or may provide the main content included as an entertainment portion of the HD-DVD disk (e.g., a movie, sporting event, or the like).

The rendered output 124 may include one or more instances of audio elements, denoted generally at 132. These audio elements may be presented alone, or in connection with other elements, such as the image/video elements 130.

The HD-DVD player 116 may cooperate with a presentation device 134 to provide the rendered output 124 to the user 102, as represented by the dashed line 136. FIG. 1 shows the dashed line 136 as bi-directional in nature, to represent not only rendered output 124 to the user, but also any responses or input provided by the user.

The presentation device 134 may include a display presentation device 138 for providing the rendered output in visible form to the user. Examples of the display presentation device 138 may include television sets, monitors, displays, or the like, implemented with any suitable display technology.

The presentation device 134 may include an audio presentation device 140 for providing the rendered output in audible form to the user. Examples of the audio presentation device 140 may include speakers or similar devices for converting electrical signals to sound waves for reception by the human ear, implemented with any suitable audio technology.

FIG. 1 shows the presentation device 134 and the HD-DVD player 116 as separate blocks only to facilitate description and illustration, but not to limit possible implementations. More specifically, the presentation device and the HD-DVD player may be implemented as stand-alone or integrated components. In similar fashion, the display presentation device 138 and the audio presentation device 140 may be implemented as stand-alone components separate from the presentation device 134, or as components integrated therewith.

Figure 2:
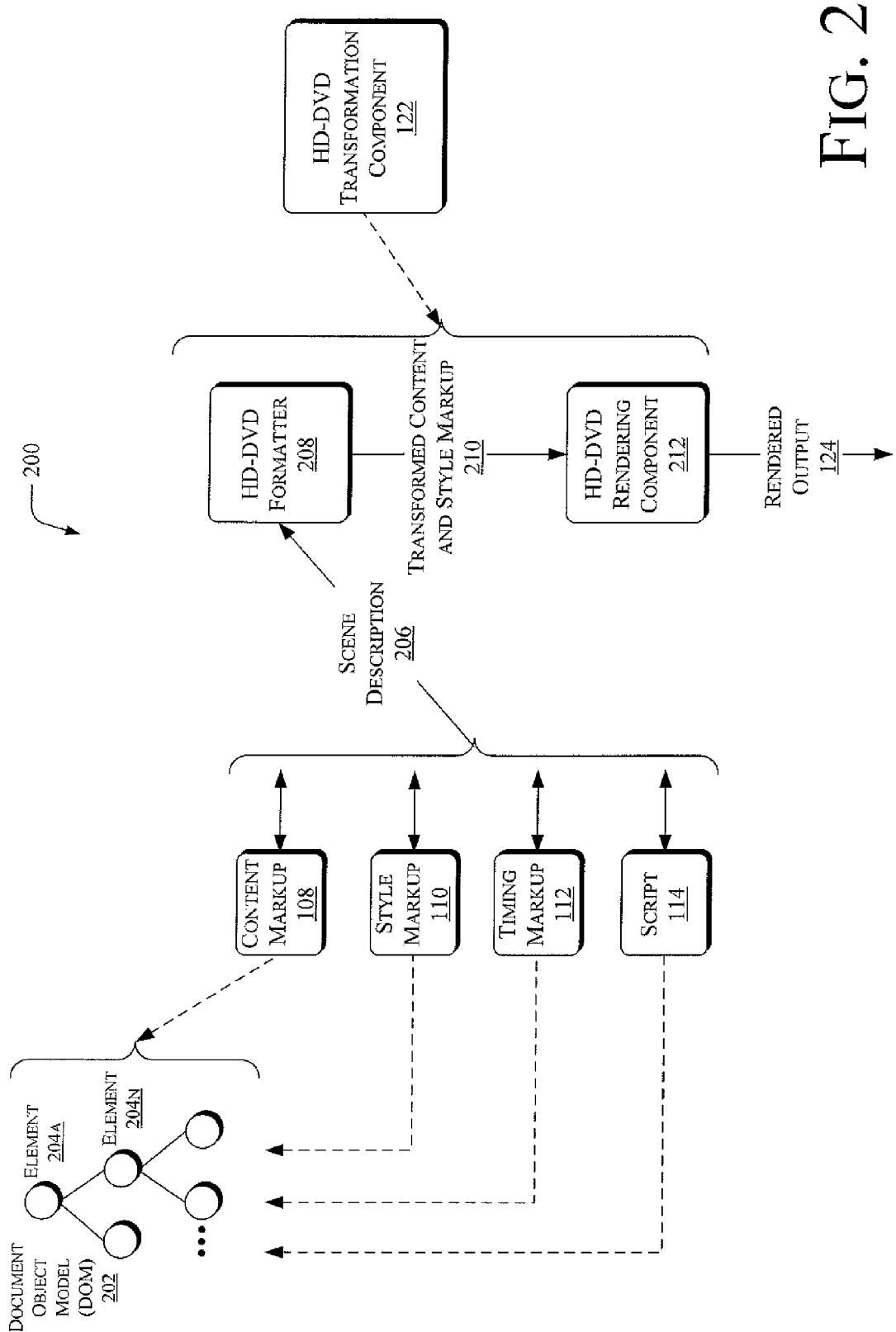
FIG. 2 is a block diagram illustrating additional aspects of an HD-DVD transformation component.

Having described the operating environments 100 with FIG. 1, the discussion now proceeds to a more detailed description of the HD-DVD transformation component 122, now presented with FIG. 2.

FIG. 2 illustrates additional aspects 200 of the HD-DVD transformation component 122. For convenience but not limitation, some elements described previously are carried forward into FIG. 2, and denoted by identical reference numbers.

Taken as a whole, the content markup 108, the style markup 110, and the timing markup 112 define a document object model (DOM) 202. The DOM 202 may be implemented as a tree data structure using an XML vocabulary. The DOM 202 may include a plurality of individual markup elements, denoted generally in FIG. 2 at 204. Table 1 above depicts sets of legal parent-child element combinations, providing specific examples of DOM states 202.

FIG. 2 shows two examples of the markup elements at 204*a* and 204*n*. However, implementations of the DOM may include an arbitrary number of elements 204, and the DOM tree may take any suitable form. The script 114 may be an imperative programming language that changes the DOM in non-deterministic ways.

These markup elements may define a scene description for what is rendered on-screen to the user. FIG. 2 denotes this scene description generally at 206. While the scene description 206 may specify what is rendered on-screen to the user, the scene description itself is expressed in a form defined by the HD-DVD Specification (as promulgated by the DVD Forum Steering Committee), rather than a form that may be directly manifested or displayed on-screen. The process of converting the scene description into a form suitable for display on-screen is referred to herein as formatting. To perform this function, the HD-DVD transformation component 122 may include an HD-DVD formatter component 208, which may include software instructions to format the scene description into a form suitable for display on-screen.

The HD-DVD formatter component 208 converts or maps the scene description language 206 into transformed content and style markup suitable for rendering on-screen to the user. FIG. 2 generally denotes the transformed content and style markup at 210. This transformed markup 210 is input to an HD-DVD rendering component 212, which includes software instructions for rendering the transformed content and style markup into final rendered output form (e.g., 124). This rendered output is suitable for presentation to the user via, for example, the presentation device 134, taking into account any particularities specific to the presentation device 134.

Figure 3:
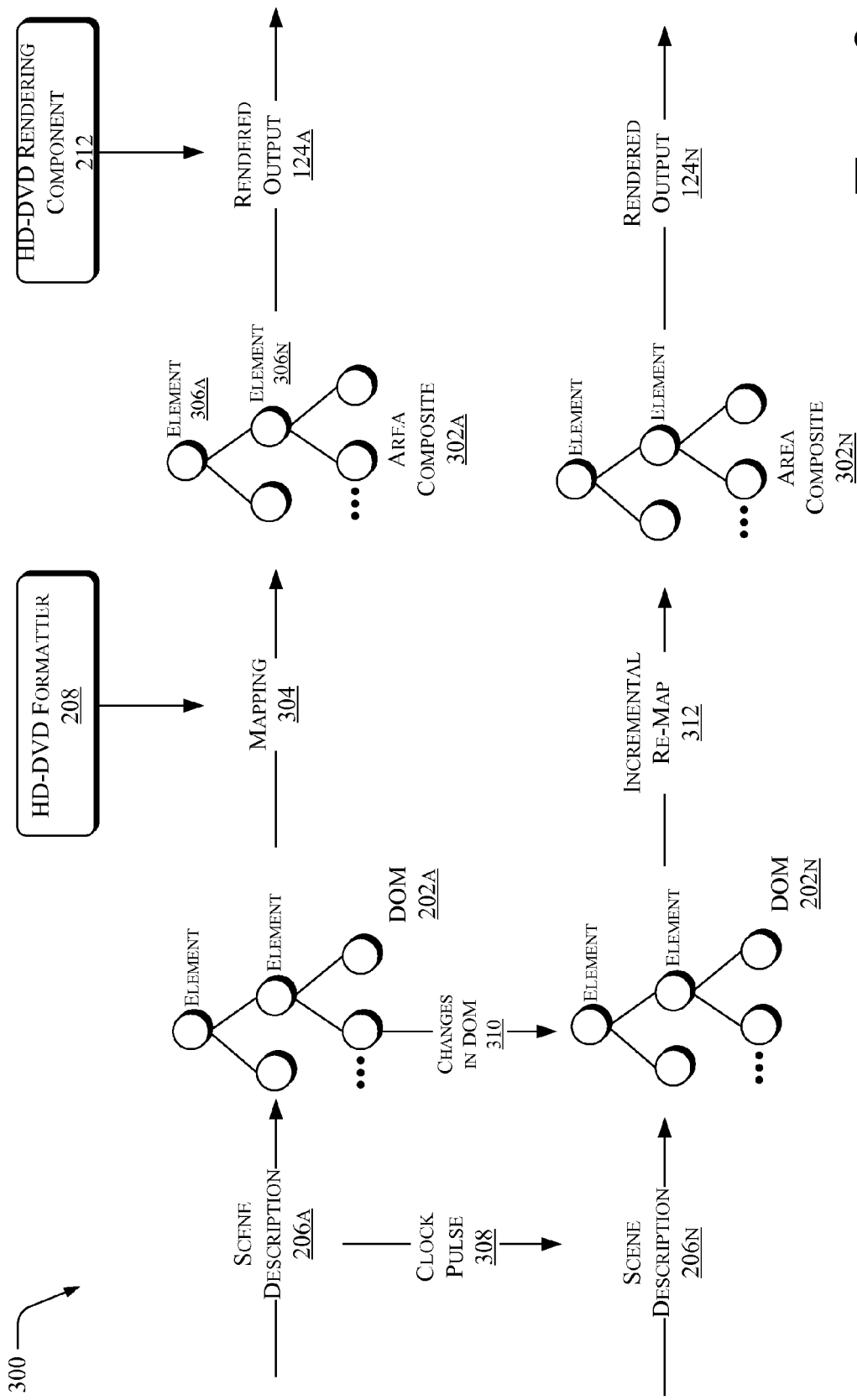
FIG. 3 is a block diagram illustrating state transitions in a scene description that occur over time.

Having described the HD-DVD transformation component 122 in more detail with FIG. 2, the discussion now proceeds to a more detailed description of the HD-DVD formatter component 208 as it may process the scene description over time, now presented with FIG. 3.

FIG. 3 illustrates state transitions 300 in the scene description that occur over time. For convenience but not limitation, some elements described previously are carried forward into FIG. 3, and denoted by identical reference numbers.

As shown in FIG. 3, a scene description in a given initial state, denoted at 206*a*, is represented by a corresponding DOM in an initial state, denoted at 202*a*. The HD-DVD formatter 208 maps the DOM state 202*a* to an area composite structure, denoted generally in FIG. 3 at 302. More specifically, the area composite state that corresponds to the DOM state 202*a* is denoted at 302*a*, while the mapping process is denoted at 304.

The area composite 302 may be implemented as a tree structure that indicates how the various elements specified in the DOM may be rendered on-screen to the user. Thus, the area composite 302 may contain an arbitrary number of elements 306*a* and 306*n* (generally, elements 306). While the DOM may be specified in the markup language chosen by the author of the HD-DVD, the area composite is expressed in terms of the capabilities of the device on which the HD-DVD content is displayed. The HD-DVD rendering component 212 may generate rendered output 124*a* based on the contents of the area composite 302*a*.

One DOM node may produce multiple area nodes, as when a DOM node that describes a paragraph produces multiple lines of text, where the overall paragraph produces one area (for example, with a background color for the paragraph), and in addition, each line produces one area (for example, with some text and/or images on that line). While one area node generally refers back to one DOM node, this may not always be true. For example, consider a case where a paragraph DOM node is fully specified by itself and no other DOM nodes, and produces paragraph areas and line areas. Each of these paragraph areas and line areas will refer both generally and specifically to the paragraph DOM node, and to no other DOM nodes.

However, consider a case where a parent paragraph DOM node defines a background color, and a child paragraph DOM node inherits that color. Then the paragraph area and line areas produced by the child paragraph DOM node will generally refer to the child paragraph DOM node. However, strictly speaking, these paragraph area and line areas will also be influenced by, and associated with, the parent paragraph DOM node that specified the background color.

FIG. 3 illustrates how the HD-DVD formatter 208 may transition the scene descriptions over time, as clock pulses or ticks occur. The clock pulses or ticks are denoted generally at 308. FIG. 3 illustrates a scenario in which a scene description in a given state, denoted at 206*a*, transitions to a next state, denoted at 206*n*, in response to the clock pulse 308.

When the clock pulse 308 occurs, this provides a signal to the HD-DVD formatter 208 that the scene description 206*a* has changed states to 206*n*. As shown in FIG. 3, the new scene description 206*n* may be associated with a new state of the DOM, denoted at 202*n*. FIG. 3 denotes at 310 any changes between the initial DOM state 202*a* and the new DOM state 202*n*.

In turn, the formatter 208 may consider these changes 310 when updating the area composite 302*a* in response to the clock pulse 308. More specifically, the formatter 208 may perform an incremental re-map of the DOM 202*n* to an updated state of the area composite, denoted at 302*n*. The term "incremental" as used herein refers to the notion of re-mapping only that portion of the new DOM state 202*n* that has changed, relative to the previous DOM state 202*a*, as distinguished from re-mapping the entire new DOM state 202*n*. FIG. 3 denotes this incremental re-mapping process generally at 312.

Once the area composite 302*a* is updated to result in area composite 302*n*, the HD-DVD rendering component 212 may produce updated rendered output 124*n*. The rendered output 124*n* reflects the changes in the scene description triggered by the clock pulse 308, as presented in final manifested form to the user.

Figure 4:
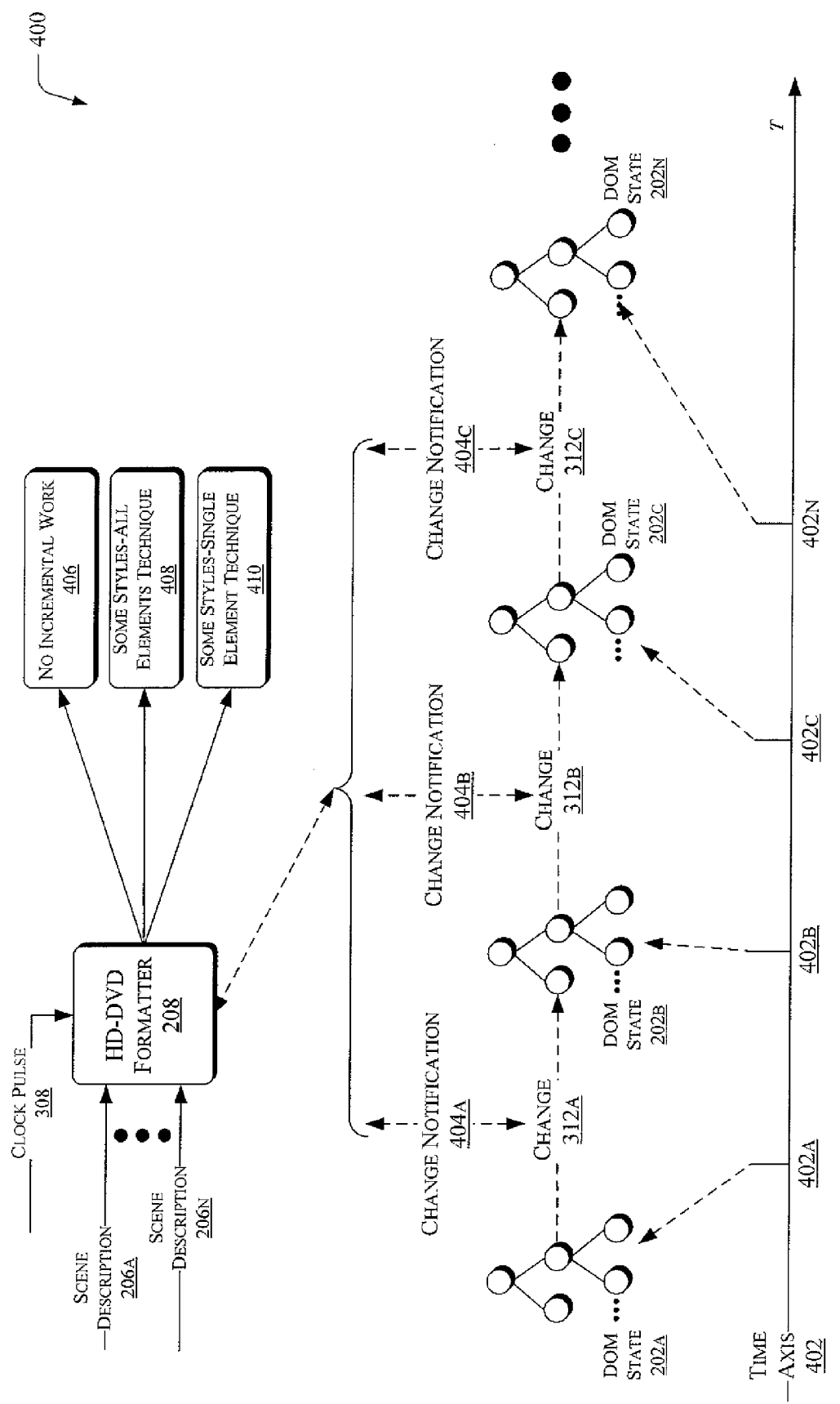
FIG. 4 is a block diagram illustrating transitions in states of a document object model (DOM) as these transitions occur over time in response to clock pulses, and illustrates how a formatter component may incrementally remap the DOM states.

Having described the HD-DVD formatter component 208 in more detail with FIG. 3, the discussion now proceeds to a more detailed description of various approaches by which the formatter component 208 may incrementally remap the DOM states as they transition over time, now presented with FIG. 4.

FIG. 4 illustrates transitions 400 in the DOM states as these transitions occur over time in response to clock pulses, and also illustrates how the formatter component 208 may incrementally remap the DOM states. For convenience but not limitation, some elements described previously are carried forward into FIG. 4, and denoted by identical reference numbers.

The formatter component 208 receives data representing a given current scene description, denoted at 206*a*, and receives indication of successive clock pulses, denoted at 308. In response to the clock pulses 308, the current scene description 206*a* transitions to a next scene description state 206*n*, with the formatter component 208 receiving indications of the next scene description state 206*n*.

As shown in FIG. 4, the different scene description states are associated with respective instances or states of the DOM, as denoted at 202*a*, 202*b*, 202*c*, and 202*n*. FIG. 4 illustrates a time axis 402, with example clock pulses 308 occurring at discrete times 402a, 402b, 402c, and 402n.

As the DOM transitions from state 202a to state 202b, for example, the formatter component 208 may determine how much the DOM changes from state to state. FIG. 4 provides three examples of changes, denoted respectively at 312a, 312b, and 312c. The changes 312a indicate changes in the DOM when transitioning from state 202a to 202b, the changes 312b indicate changes in the DOM when transitioning from state 202b to 202c, and the changes 312c indicate changes in the DOM when transitioning from state 202c to 202n.

The formatter component 208 and/or other components of the HD-DVD player 116 may generate messages indicating the scope and content of these changes. FIG. 4 illustrates three examples of these change notification messages at 404a, 404b, and 404c (collectively, change notification messages 404). It is noted that implementations of the description herein may support any number of transitions of DOM states.

Depending on the nature and scope of a particular set of changes as reflected in the change notification messages 404, the formatter component 208 may employ different techniques for incrementally remapping or reformatting the DOM state to derive updated area composites. FIG. 4 illustrates three techniques.

In a first scenario, denoted at 406, the formatter component 208 performs no incremental work because of the changes 310. In this first scenario, the transition in DOM state does not result in any incremental remapping or reformatting. Examples of when this first scenario may occur are given below.

In a second scenario, denoted at 408, the formatter component 208 employs a "some styles-all elements" technique. In this second technique, the formatter component evaluates the all elements contained with the DOM markup tree, but only evaluates the styles that change because of a state transition.

In a third scenario, denoted at 410, the formatter component 208 employs a "some styles-single elements" technique. In this third technique, the formatter component evaluates a single node in the tree of markup, and within that single node, only evaluates those styles that were modified because of the state transition.

Figure 5:
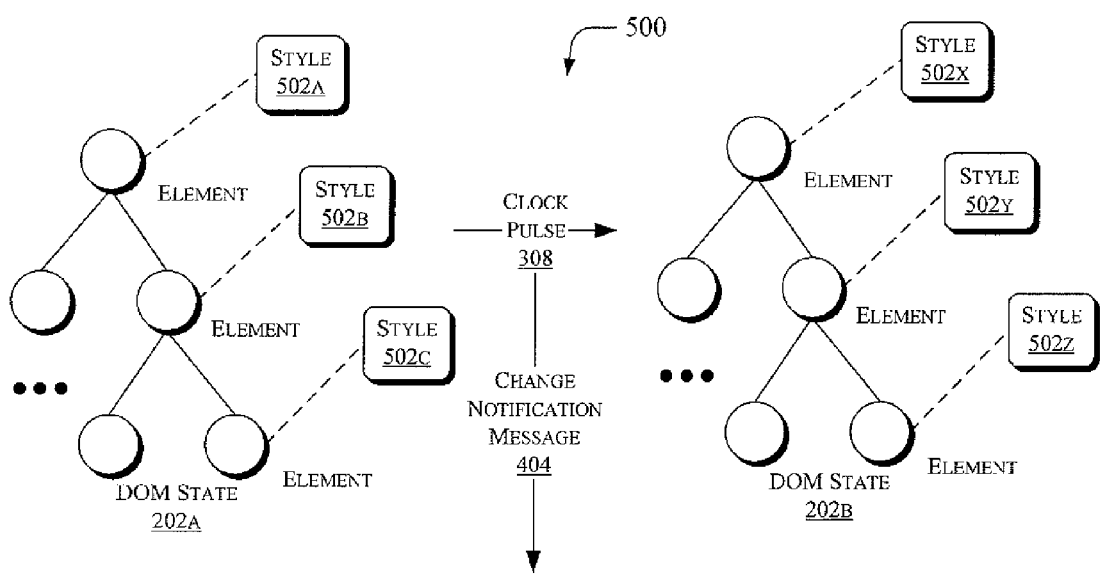
FIG. 5 is a flow diagram illustrating processes for incrementally updating and formatting HD-DVD markup.
Figure 5:
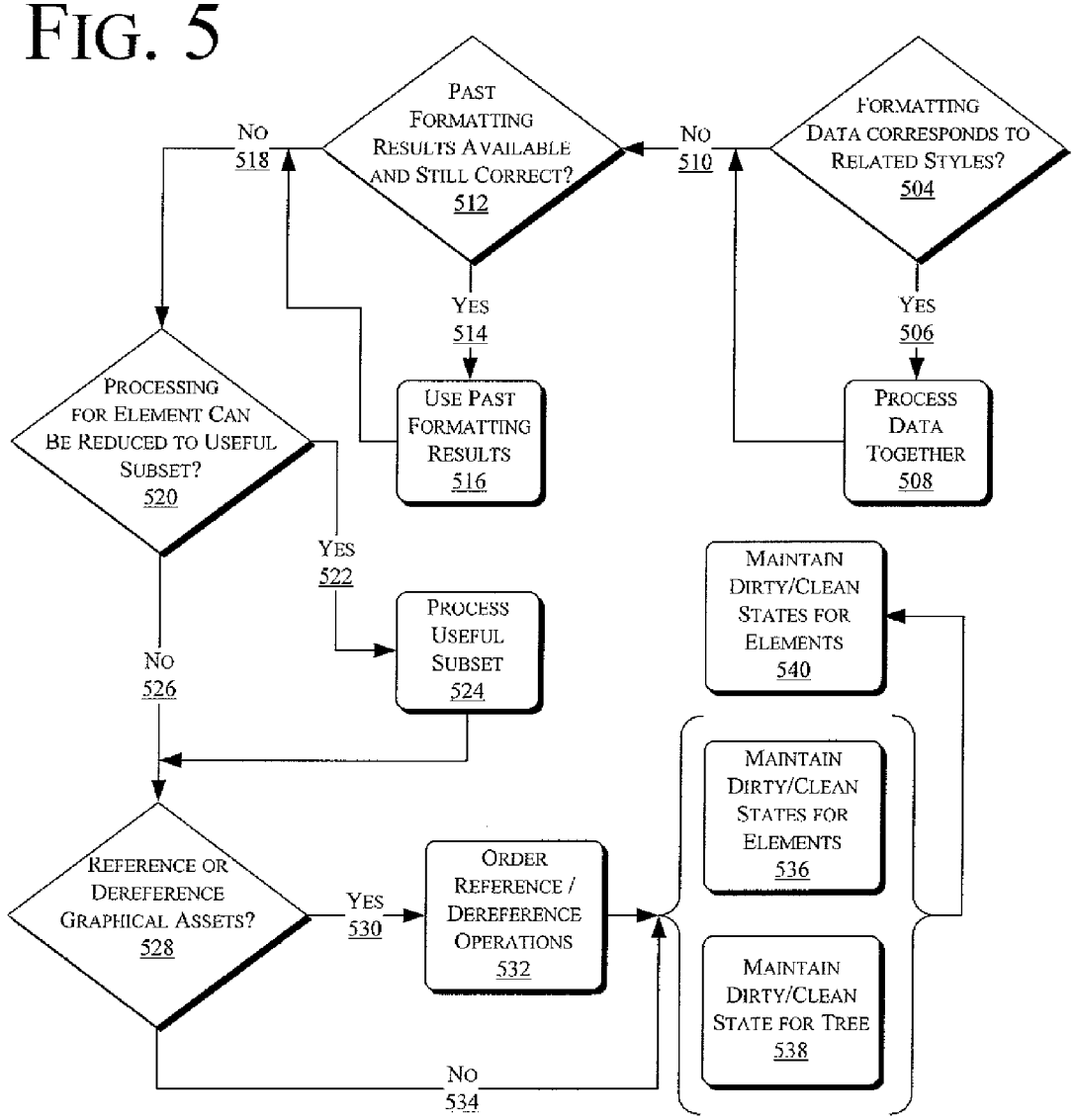

Having described the various approaches by which the formatter component 208 may incrementally remap the DOM states as they transition over time with FIG. 4, the discussion now proceeds to a description of process flows that the formatter component 208 may perform, now presented with FIG. 5.

FIG. 5 illustrates process flows 500 for incrementally updating and formatting HD-DVD markup. For convenience but not limitation, some elements described previously are carried forward into FIG. 5, and denoted by identical reference numbers. While the process flows 500 are described in connection with certain components, such as the formatter component 208, it is noted that other components may perform at least part of the process flows 500 without departing from the scope and spirit of the description herein.

FIG. 5 illustrates a DOM state 202a transitioning to a DOM state 202b in response to a clock pulse 308. The DOM states 202 may be represented as tree structures, including a plurality of elements, as described above. As shown in FIG. 5, elements within these trees may be associated with respective styles, denoted generally at 502. FIG. 5 illustrates examples of these styles within the DOM state 202a at 502a, 502b, 502c, and within the DOM state 202b at 502x, 502y, and 502z.

As the DOM state 202a transitions to the DOM state 202b, some (or possibly none) of these styles 502 may change, as indicated in a change notification message 404.

The tools described herein may perform at least portions of the process flow 500 in response to receiving the change notification message 404. Before proceeding with the description of FIG. 5, and the other flow diagrams included herein, it is noted that the blocks depicted in these flow diagrams are presented in the orders shown only for convenience, but not for limitation. Implementations of these process flows may perform these blocks in any convenient order.

Block 504 represents evaluating whether the formatting changes indicated in the change notification message correspond to related styles. If so, the process flow 500 may take Yes branch 506 to block 508, which represents processing any data together that correspond to related styles.

Styles may be related and processed together when multiple change notifications are delivered together. For example, a change notification message (e.g., 404) may include change A, change B, change C, and change D, where changes B and C are related and may be processed together.

Styles may also be related and processed together when many styles affect the same portion of one area in the area composite. For example, one portion of an area in the area composite is the background rectangle, essentially the bounding box (x0,y0)-(x1,y1) that describes where a background color and/or background image are drawn, if the area has a background color or background image. Many styles may affect this background rectangle, including but not limited to style:anchor, style:x, style:y, style:position, style:inlineProgressionDimension, style:blockProgressionDimension, style:writingMode, style:width, and style:height. Thus, these styles may all be processed at once, as ultimately the calculation to compute the background rectangle in the area will take into account each of these styles. However, while the style:color of the background rectangle is related to the bounding box for this area, the color does not participate in the computation of the bounding box, and changes in color would be processed separately from changes in width, height, etc.

Returning to block 504, if the formatting changes indicated in the change notification message do not correspond to related styles, then the process flow may take No branch 510 to evaluation block 512.

Evaluation block 512 represents determining whether past formatting results are available, and if available, whether these past results are still correct for the DOM state 202b. If so, the process flow 500 may take Yes branch 514 to block 516, which represents using these past formatting results in the current reformatting operation triggered by the clock pulse 308.

From evaluation block 512, if the result of the evaluation is negative, the process flow may take No branch 518 to evaluation block 520, which represents evaluating whether any style changes triggered by the clock pulse affect all elements in the DOM, or only a subset of the elements in the DOM. If the style changes are determined to affect only a subset of these elements, then the process flow 500 may take Yes branch 522 to block 524, which represents processing the affected useful subset of the elements within the DOM.

From evaluation block 520, if the result of the evaluation is negative, the process flow 500 may take No branch 526 to evaluation block 528, which represents determining whether the transition from DOM state 202a to state 202b involves referencing and/or dereferencing graphical assets. Examples of graphical assets include image or font files whose use may involve decompression operations.

From evaluation block 528, if the result of the evaluation is positive, then the process flow 500 may take Yes branch 530 to block 532, which represents ordering any referencing and/or dereferencing operations, such that a properly authored application as stored on the HD-DVD does not exceed platform limitations (e.g., does not exceed limits of pixel buffers).

From evaluation block 528, if the result of the evaluation is negative, then the process flow 500 may take No branch 534 to block 536, which represents associating a clean or dirty state with the various elements in the DOM tree. More specifically, if the change in DOM state from 202*a* to 202*b* results in changes to particular elements of the DOM tree, then block 536 may include marking those particular elements as "dirty", and marking the remaining elements of the DOM tree as "clean".

Block 538 represents associating a clean or dirty state with the DOM tree as a whole. More specifically, if the change from DOM state 202*a* to DOM state 202*b* results in any changes to the DOM tree, then block 538 may include marking the DOM tree as "dirty". Otherwise, if the change in DOM state does not result in changes to the DOM tree as a whole, then block 538 may include marking the DOM tree as "clean".

Block 540 represents reformatting on those elements and/or styles within the DOM tree that have been marked as "dirty" by block 536 and/or 538.

The various operations shown in FIG. 5 provide different optimization strategies. Implementations of the tools described herein may employ one or more of these optimization strategies as appropriate in different circumstances. More specifically, these optimization strategies may support the some styles-all elements technique (e.g., block 406 in FIG. 4) and/or the some styles-single element technique (e.g., block 408 in FIG. 4).

Figure 6:
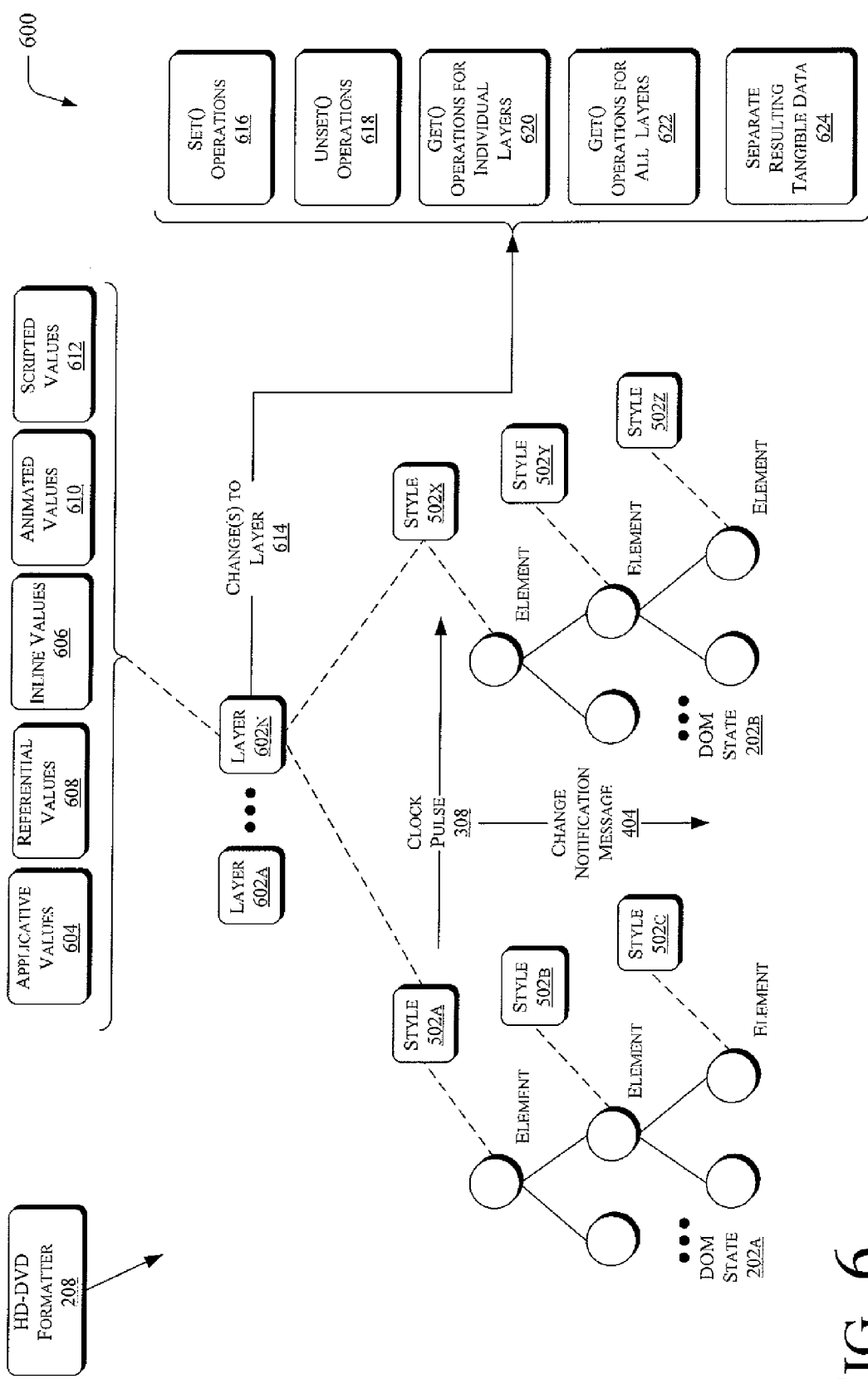
FIG. 6 is a block diagram illustrating arrangements in which HD-DVD style data is organized into layers.

Having described the process flows that the formatter component 208 may perform with FIG. 5, the discussion now proceeds to a description of organizing the HD-DVD style data into layers, now presented with FIG. 6.

FIG. 6 illustrates arrangements 600 in which HD-DVD style data is organized into layers. For convenience but not limitation, some elements described previously are carried forward into FIG. 6, and denoted by identical reference numbers.

As shown in FIG. 6, the DOM state 202*a* transitions to DOM state 202*b* in response to the clock pulse 308, resulting in the HD-DVD formatter 208 generating a change notification message 404. The styles 502 are carried forward from FIG. 5.

The formatter 208 may support the notion of layer structures. FIG. 6 depicts two examples of layers at 602*a* and 602*n* (generally, 602), but implementations of the tools described herein could support any number of layers. The layers 602 may organize the various style data appearing in a given DOM state. In the example shown in FIG. 6, the layer 602*n* is associated with the style 502*a* in the DOM state 202*a*, and with the style 502*x* in the DOM state 202*b*. Other layers (e.g., layer 602*a*) may organize other styles 502, although FIG. 6 omits these relationships in the interests of clarity.

Examples of criteria by which the layers may organize the style data include separating the style data to support the applicative, referential, inline, animated, and scripted values allowed by a declarative language in which the HD-DVD is authored. FIG. 6 represents these values at blocks 604, 606, 608, 610, and 612, respectively.

When the DOM changes state from 202*a* to 202*b*, the formatter 208 may report changes to different layers resulting from the state change. FIG. 6 denotes these changes to the layers at 614. These changes may be expressed as, for example, one or more set( ) operations for different styles in the individual layers, as represented at block 616.

Block 618 represents expressing these changes as one or more unset( ) operations for different styles in the individual layers. Block 620 represents expressing these layer changes as one or more get( ) operations for the styles for the individual layers. Block 622 represents expressing these layer changes as one or more get( ) operations performed for all styles in all layers, considering the relative priority of each layer to determine an effective value. Block 624 represents separating the resulting tangible data by layers.

As examples of the set( ) and unset( ) operations, consider a case where in the declarative content markup and declarative style markup, the initial state of some element is that style:x="10 px" due style:x being applied inline. Consider than in the declarative timing markup, at a time 3 minutes into the playback of a movie, the element is programmed to move from 10 px to 100 px over the course of 5 seconds, and then move back over the course of 5 seconds.

For the entire duration of the movie, including the portion in which animation is occurring, the inline value of style:x remains 10 px. This value was set( ) during load and is never unset( ).

For the first 3 minutes of the movie, no value of style:x exists at the animated layer. At 3 minutes into the playback of the movie, the animated value of style:x is set( ) to 10 px. For the next 10 seconds, the animated value of style:x is set( ) to values from 10 thru 100 and back according to the performance of the system, and other programming considerations.

At 3 minutes and 10 seconds into the playback of the movie, the animated value of style:x is unset( ). After 3 minutes and 10 seconds into the playback of the movie, no value of style:x exists at the animated layer. Now, for the first 3 minutes of the movie, the effective value is the value from the inline layer. From 3:00 to 3:10, the effective value is the value from the animated layer. At 3:10, the effective value is again the value from the inline layer.

As an example of the get( ) operation, consider again the button above, with a static inline value of style:x, and an animated value of style:x for some period of time. A get( ) operation may be performed by formatting to determine the effective value, essentially a component outside of the layer component asking for a final number. To accommodate this request, the layer component may make subordinate calls to get( ) the value stored at individual layers, and then select from the available layers the appropriate effective value according to the precedence rules in the HD-DVD spec. Thus there are two versions of get( )—the layer get( ), which serves to support the effective get( )

Figure 7:
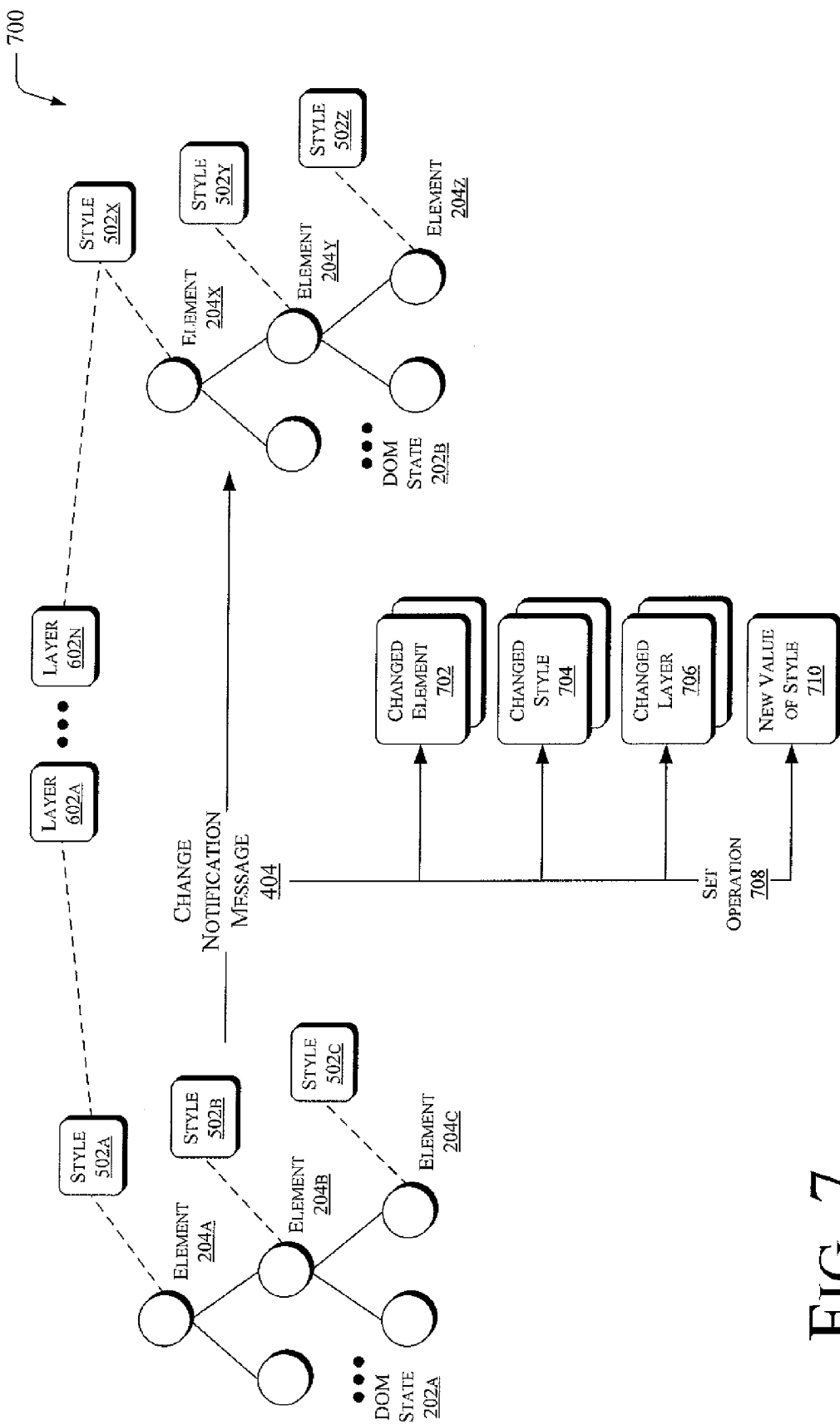
FIG. 7 is a block diagram illustrating additional aspects of a change notification message.

Having described techniques for organizing the HD-DVD style data into layers with FIG. 6, the discussion now proceeds to a more detailed description of change notification messages, now presented with FIG. 7.

FIG. 7 illustrates additional aspects 700 of a change notification message. For convenience but not limitation, some elements described previously are carried forward into FIG. 7, and denoted by identical reference numbers.

As described above, a change notification message (e.g., 404) may result when the DOM state 202*a* transitions to DOM state 202*b*. Depending on the nature and scope of the changes resulting from the state transitions, the change notification message may include different types of information.

In the example shown in FIG. 7, the change notification message may indicate that one or more elements are changing because of the state transitions, as represented at 702. Examples of elements are shown at 204a-b and 204x-z.

The change notification message may indicate that one or more styles are changing because of the state transitions, as represented at 704. Examples of styles are shown at 502a-c and 502x-z.

The change notification message may indicate that one or more layers are changing because of the state transitions, as represented at 706. Examples of layers are shown at 602a-n.

Line 708 represents instances in which changes to the DOM are expressed in one or more set( ) operations. In such instances, the change notification may specify a new value of the style, as represented at block 710.

Figure 8:
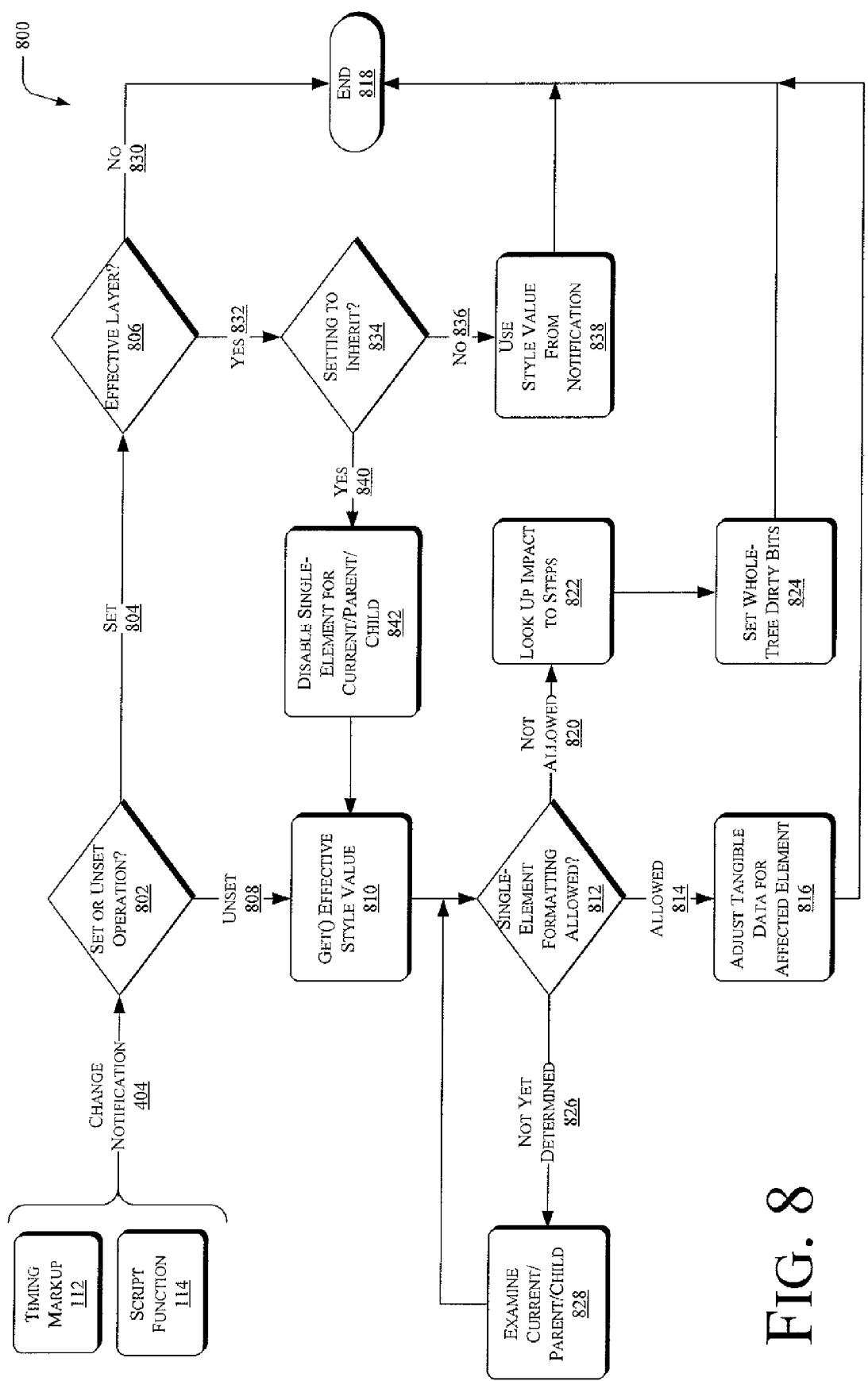
FIG. 8 is a flow diagram illustrating processes that may be performed as reactions to change notification messages.

Having provided a more detailed description of change notification messages with FIG. 7, the discussion now proceeds to a description of process flows for reactions to the change notification messages, now presented with FIG. 8.

FIG. 8 illustrates process flows 800 that may be performed as reactions to the change notification messages. For convenience but not limitation, some elements described previously are carried forward into FIG. 8, and denoted by identical reference numbers.

As shown in FIG. 8, changes in DOM state specified in timing markup (e.g., 112) or in a script (e.g., 114) may result in change notification messages (e.g., 404). In response to a change notification message, the tools may perform at least part of the process flows 800.

Evaluation block 802 represents determining whether the incoming change notification message 404 specifies a set( ) or unset( ) operation. If the message 404 specifies a set( ) operation, the process flow 800 may take branch 804 to evaluation block 806. If the message specifies an unset( ) operation, the process flow 800 may take branch 808 to block 810.

Block 810 represents performing a get( ) operation to obtain an effective style value as specified in the message 404.

Evaluation block 812 represents determining whether the incoming message 404 allows single-element formatting. If so, the process flow 800 may take branch 814 to block 816, which represents adjusting tangible data related to the single element specified in the incoming message 404. Afterwards, the process flow 800 may proceed to an end state 818.

From evaluation block 812, if single-element formatting is not allowed, the process flow 800 may take branch 820 to block 822, which represents looking up the impact of the reformatting specified in the incoming message.

As an example of looking up the impact of formatting, consider again the parent paragraph defining a background color, and a child paragraph that inherits that color. If the background color of that parent paragraph changes, then any child that inherits that changed value will also change. Thus, the parent paragraph is not allowed to format style:backgroundColor using single-element formatting. The knowledge of whether or not this formatting is allowed is computed in block 828 and stored as part of the configuration of the formatting software corresponding to the parent paragraph.

Block 824 represents setting a bit or other suitable mechanism to indicate that the entire DOM tree is impacted by the reformatting specified in the incoming message, and is therefore "dirty". Afterwards, the process flow 800 may proceed to the end state 818.

From evaluation block 812, if the question of whether or not single-element formatting is allowed has not yet been determined, the process flow 800 may take branch 826 to block 828, which represents examining the current parent and/or child in the tree. Afterwards, the process flow 800 may return to just before evaluation block 812, as shown in FIG. 8.

In the configuration of the formatting software corresponding to some element is stored a reference to the parent element, first child element, and next sibling element. Using these three links, the tree may be traversed up and/or down and/or across as appropriate. All or a part of the tree may be traversed to determine if single-element formatting is permitted.

While a change notification message may not specify whether single-element formatting is permitted, the change notification message may include some information that informs the decision to either allow or disallow single-element formatting.

As an example, consider a parent button that defines background color red, and a child button that defines background color blue. If the child button is changed to ignore the color blue, and instead inherit the red background color from its parent, then single element formatting is disabled for the parent, as changes to the parent now affect the child.

As another example, consider a parent paragraph with no explicit size, and a child span that contains the text "Hello, World". The default size of this parent paragraph will then be based upon several things, but the important one for the description here is the size of the span containing the glyphs for the string "Hello, World".

As yet another example, consider then a change notification where the child span is modified to contain "The Quick Brown Fox" instead of "Hello, World". Clearly, the span is going to get larger, as there is now more text in the span. Clearly, the parent paragraph that is primarily sized according the size of the span is now also going to get larger. Thus, the span may not be formatted according to the single-element means in this case.

Generally, impacts may include parent-child impacts and child-parent impacts. In implementations, these impacts may be numerous, and not limited to the inheritance and sizing examples provided above for illustration only.

Returning to evaluation block 806, this block represents determining whether the layer specified in the message 404 is an effective layer in the reformatting process. The DVD Specification defines which layers are effective or have precedence in particularly circumstances. If the layer specified in the message is not an effective layer, the process flow 800 may take No branch 830 to the end state 818. On the other hand, if the layer specified in the message 404 is an effective layer, then the process flow 800 may take Yes branch 832 to evaluation block 834.

Block 834 represents determining whether the current node being examined is set to inherit at least some of its attributes from another node. For example, the current node may be a child node that inherits at least some of its attributes from a parent node. As another example, the current node may be a parent node, at least one of whose attributes are based on attributes of its children. Generally, the change message, when it is a set message, includes the value that is being set. One special type of value is the 'inherit' value.

From evaluation block 834, if the current node is not set to inherit from another node, then the process flow 800 may take No branch 836 to block 838, which represents using a style value as specified in the incoming message 404. Afterwards, the process flow 800 may proceed to the end state 818.

From evaluation block 834, if the current node is set to inherit from another node, then the process flow 800 may take Yes branch 840 to block 842, which represents disabling single-element formatting for the current node, as well as any parent or child nodes of the current node. Because the current node is inheriting from other nodes, any changes resulting from reformatting may tend to cascade throughout at least part of the tree, and in this case, single-element formatting may not be appropriate. Afterwards, the process flow 800 may proceed to block 810, which was described above.

If the process flow reaches evaluation block 812 after passing through block 842, then block 842 will have disabled single-element formatting. In this event, the process flow 800 may take branch 820 to block 822. In turn, block 822 may include ascertaining how much the changes resulting from the inheritance relationship of block 834 cascades through the tree.

Figure 9:
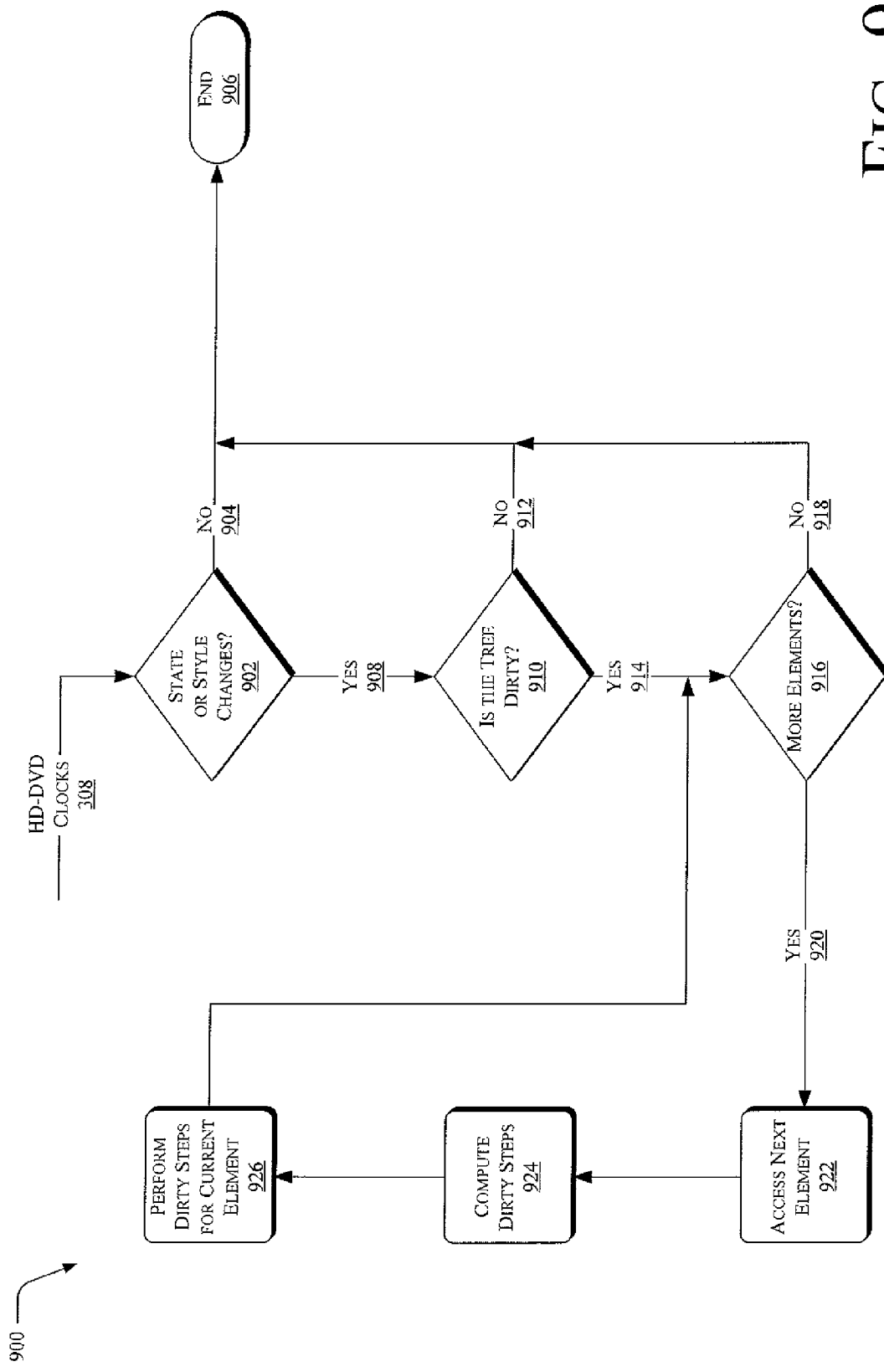
FIG. 9 is a flow diagram illustrating processes for performing per-frame formatting in response to clock signals.

Having described the process flows 800 for reactions to the change notification messages with FIG. 8, the discussion now proceeds to a description of process flows for performing per-frame formatting, now presented with FIG. 9.

FIG. 9 illustrates process flows 900 for performing per-frame formatting in response to clock signals. For convenience but not limitation, some elements described previously are carried forward into FIG. 9, and denoted by identical reference numbers.

FIG. 9 shows examples of HD-DVD clocking signals at 308. The tools described herein may perform at least some of the process flows 900 in response to discrete instances of the clocking signals. As described above, markup for HD-DVD scene descriptions may be represented in tree-type structures, and as the clocking signals occur, the tools may update the markup and reformat the updated markup for rendering and presentation to a user (e.g., 102 in FIG. 1).

Block 902 represents evaluating whether the clocking signals result in any state or style changes within the tree structure representing the scene description. If no state or style changes result from the clocking signals, the process flows 900 may take No branch 904 to end state 906. On the other hand, if any state or style changes result from the clocking signals, the process flows 900 may take Yes branch 908 to block 910.

Block 910 represents evaluating whether any part of the tree structure has become dirty as a result from the state or style changes evaluated in block 902. Put differently, block 910 may include evaluating whether at least one element within the tree is to change because of the state or style changes. More specifically, block 910 may include traversing the tree to select a given element within the tree to be processed for any state or style changes.

If no element within the tree is to be changed, the process flows 900 may take No branch 912 to the end state 906. On the other hand, any element within the tree is to be changed, the process flows 900 may take Yes branch 914 to block 916, which represents evaluating whether the tree traversal is complete. If no elements within the tree remain for traversal, the process flows 900 may take No branch 918 to end state 906. On the other hand, if any elements within the tree remain for traversal, the process flows 900 may take Yes branch 920 to block 922.

Block 922 represents traversing the tree to access at least one next element remaining in the tree as a current element. Block 924 represents determining or computing any changes to be made to the current element. These changes may be viewed as "dirty steps", as indicated in FIG. 9. Block 926 represents performing any dirty steps on the current element. Afterwards, the process flows 900 may return to block 916 to check for any additional elements remaining in the tree that remain for traversal and processing. Blocks 922, 924, and 926 may be repeated for the various elements contained within a given markup tree.

Figure 10:
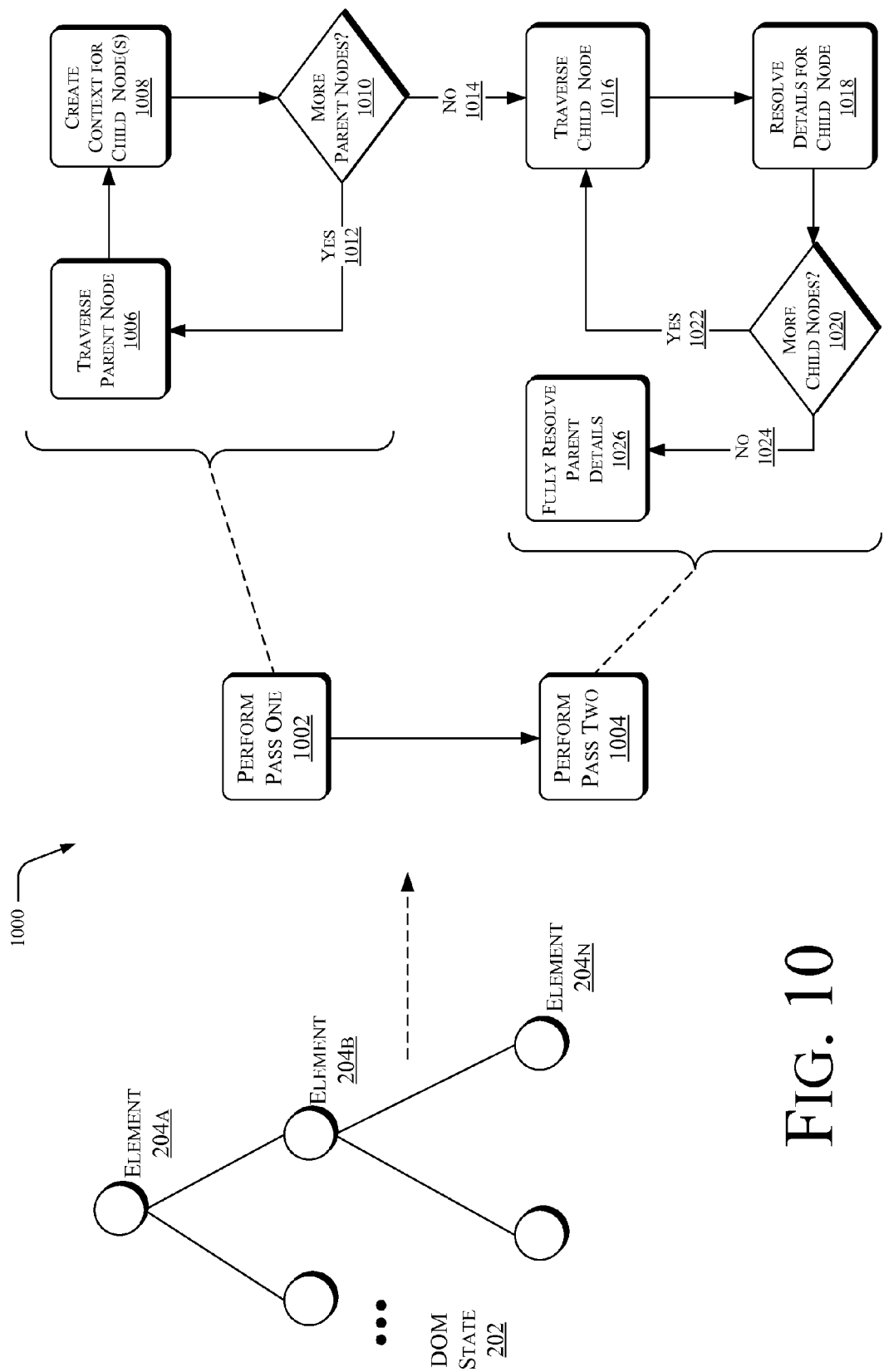
FIG. 10 is a flow diagram illustrating processes for traversing parent and child nodes of the markup trees.

Having described the process flows 900 for performing per-frame formatting with FIG. 9, the discussion now proceeds to a more detailed description of traversing parent and child nodes of the markup trees, now presented with FIG. 10.

FIG. 10 illustrates process flows 1000 for traversing parent and child nodes of the markup trees. For convenience but not limitation, some elements described previously are carried forward into FIG. 10, and denoted by identical reference numbers.

FIG. 10 denotes an example DOM tree of scene description markup at 202. This example DOM tree 202 may include an arbitrary number of elements, with FIG. 10 denoting three examples at 204a, 204b, and 204n. The process flows 1000 may perform a two-pass process in traversing the tree structure, when reformatting the scene descriptions. Block 1002 represents performing a first pass, while block 1004 represents performing a second pass.

Turning in more detail to the first pass represented in block 1002, block 1006 represents traversing a given parent node within the DOM tree. The process flows 1000 may begin with a root node of the DOM tree (e.g., 204a), and traverse the tree from there. Afterwards, the traversal may progress to parent nodes beneath the root node (e.g., 204b) that have one or more child nodes beneath them.

Block 1008 represents creating a context, at the current node, by performing as much reformatting work as possible at the current node, before proceeding to the child nodes of that current node.

Block 1010 represents determining whether any additional parent nodes remain for processing in the DOM tree. If so, the process flows 1000 may take Yes branch 1012 to return to block 1006, to select a next parent node in the tree. Otherwise, the process flows 1000 may take No branch 1014. Branch 1014 completes the detailed processing for the first pass, and begins the detailed processing for the second pass, as shown in FIG. 10.

Turning to block 1004 in more detail, block 1016 represents traversing the tree to access any child nodes under a given parent node. Block 1018 represents resolving details for processing the child nodes that are under the given parent node.

Evaluation block 1020 represents determining whether the given parent node has any additional child nodes beneath it that remain for processing. If so, then processing may take Yes branch 1022 back to block 1016, to repeat the process with a next child node. If the given parent node has no additional child nodes beneath it, then processing may take No branch 1024 to block 1026, which represents fully resolving details relating to the given parent node, having resolved the details for all child nodes beneath the given parent node.

Having described the process flows 1000 for traversing parent and child nodes of the markup trees with FIG. 10, the discussion now proceeds to a more detailed description of content markup references and overall iteration through markup trees.

Table 2, presented below, illustrates an example separation of passes through the tree, denoted as Pass 1 and Pass 2.

TABLE 2

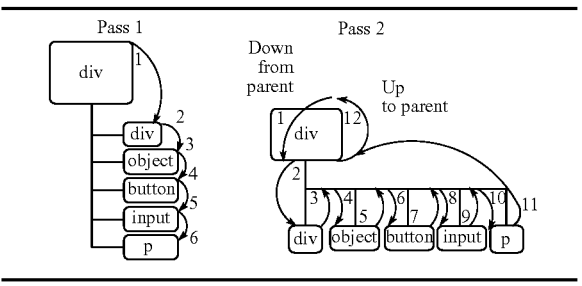

As described above in FIG. 10, Pass 1 traverses downward through the parent nodes, and establishes context for child nodes. During Pass 2 up, child details are fully resolved, allowing the parent details fully to resolve.

CONCLUSION

While the foregoing description is presented in the context of processing HD-DVDs, it is noted that the tools and techniques described herein may be suitable for processing other types of media, or for processing markup of types other than those described herein.

Although the systems and methods have been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

In addition, regarding certain data and process flow diagrams described and illustrated herein, it is noted that the processes and sub-processes depicted therein may be performed in orders other than those illustrated without departing from the spirit and scope of the description herein. Also, while these data and process flows are described in connection with certain components herein, it is noted that these data and process flows could be performed with other components without departing from the spirit and scope of the description herein.

The invention claimed is:

1. One or more machine-readable storage media comprising machine-readable instructions that, when executed by the machine, cause the machine to perform a method comprising:
   receiving first markup representing a first scene description to be read from a high-definition digital versatile disk (HD-DVD);
   mapping at least part of the first markup into a first area composite for presentation to a user;
   receiving second markup representing a second scene description to be read from the HD-DVD;
   in response to receiving the second markup, incrementally remapping a portion of the first scene description into a second area composite for presentation to the user;
   generating at least one change notification message in response to receiving the second markup; and
   determining whether a layer specified in the change notification message is an effective layer.

2. The machine-readable storage media of claim 1, wherein the instructions for receiving first markup include instructions for receiving at least one of content markup, style markup, and timing markup read from the HD-DVD.

3. The machine-readable storage media of claim 1, wherein the instructions for incrementally remapping a portion of the first scene description include instructions for remapping some styles of all elements represented in the first scene description.

4. The machine-readable storage media of claim 1, wherein the instructions for incrementally remapping a portion of the first scene description include instructions for remapping some styles of a single element represented in the first scene description.

5. The machine-readable storage media of claim 1, wherein the instructions for incrementally remapping a portion of the first scene description include instructions for determining to perform no incremental remapping of the first scene description.

6. The machine-readable storage media of claim 1, further comprising instructions for receiving the second markup in response to a clock pulse.

7. The machine-readable storage media of claim 1, wherein the instructions for generating the change notification message include instructions for generating a change notification message that includes an indication of at least one element in the first scene description that is changed in the second scene description.

8. The machine-readable storage media of claim 1, wherein the instructions for generating the change notification message include instructions for generating a change notification message that includes an indication of at least one style in at least one element in the first scene description that is changed in the second scene description.

9. The machine-readable storage media of claim 1, wherein the instructions for generating the change notification message include instructions for generating a change notification message that includes an indication of at least one element or style that is in a layer defined in the first scene description that is changed in the second scene description.

10. The machine-readable storage media of claim 1, wherein the instructions for generating the change notification message include instructions for generating a change notification message that includes an indication of at least one new value of a style of an element defined in the first scene description that is changed in the second scene description.

11. A device for playing HD-DVDs that includes the machine-readable storage media of claim 1.

12. A device for playing high-definition digital versatile disks (HD-DVDs), the device comprising:
   a processor;
   one or more computer readable storage media that includes an HD-DVD transformation component for:
      receiving first markup representing a first scene description to be read from the HD-DVD;
      mapping at least part of the first markup into a first area composite for presentation to a user;
      receiving second markup representing a second scene description to be read from the HD-DVD;
      in an event that one or more changes occur between the first scene description and the second scene description,
      generating a change notification message that includes an indication of at least one element or style that is in a layer defined in the first scene description that is changed in the second scene description;
      incrementally remapping a portion of the first scene description into at least a second area composite for presentation to the user.

13. The device of claim 12, wherein the HD-DVD transformation component is for remapping some styles of a single element represented in the first scene description.

14. The device of claim 12, wherein the HD-DVD transformation component is for remapping some styles of all elements represented in the first scene description.

15. One or more machine-readable storage media comprising machine-readable instructions that, when executed by the machine, cause the machine to perform a method comprising:
  receiving first markup representing a first scene description to be read from a high-definition digital versatile disk (HD-DVD);
  mapping at least part of the first markup into a first area composite for presentation to a user;
  receiving at least second markup representing at least a second scene description to be read from the HD-DVD;
  in response to receiving the second markup:
    determining whether at least one first element included in the first scene description is set to inherit at least one attribute from another element included in the first scene description; and
    incrementally remapping a portion of the first scene description into at least a second area composite for presentation to the user.

16. The machine-readable storage media of claim 15, further comprising instructions for disabling single-element remapping of the first element in response to determining that the element is set to inherit the at least one attribute.

17. The machine-readable storage media of claim 15, further comprising instructions for performing single-element remapping of the first element in response to determining that the element is not set to inherit the at least one attribute.

18. The machine-readable storage media of claim 17, wherein the instructions for performing single-element remapping of the first element include instructions for using a style value for the single element as specified in a change notification message.

* * * * *